D. A. CALLAWAY.
HEAD GATE FOR IRRIGATING DITCHES.
APPLICATION FILED JAN. 10, 1908.
947,326.
Patented Jan. 25, 1910.
2 SHEETS—SHEET 1.
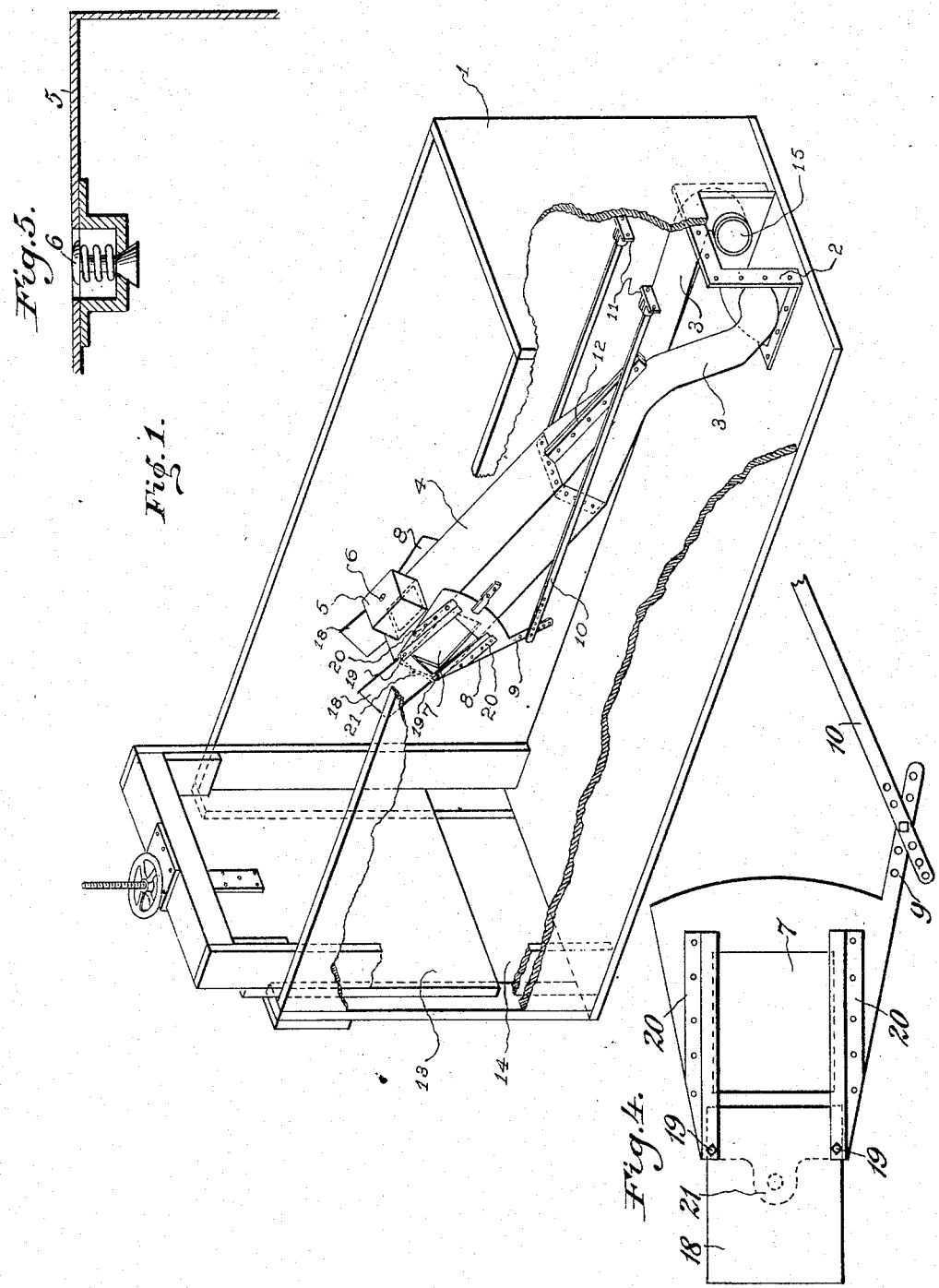
Witnesses.
Inventor.
David Abram Callaway D. A. CALLAWAY.
HEAD GATE FOR IRRIGATING DITCHES.
APPLICATION FILED JAN. 10, 1908.
947,326.
Patented Jan. 25, 1910.
2 SHEETS—SHEET 2.
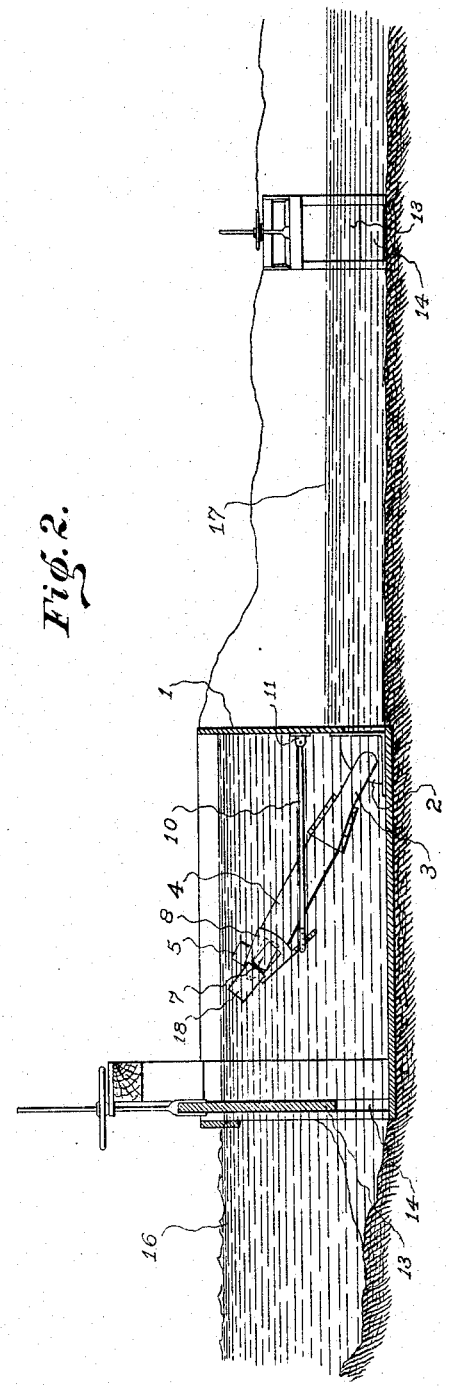
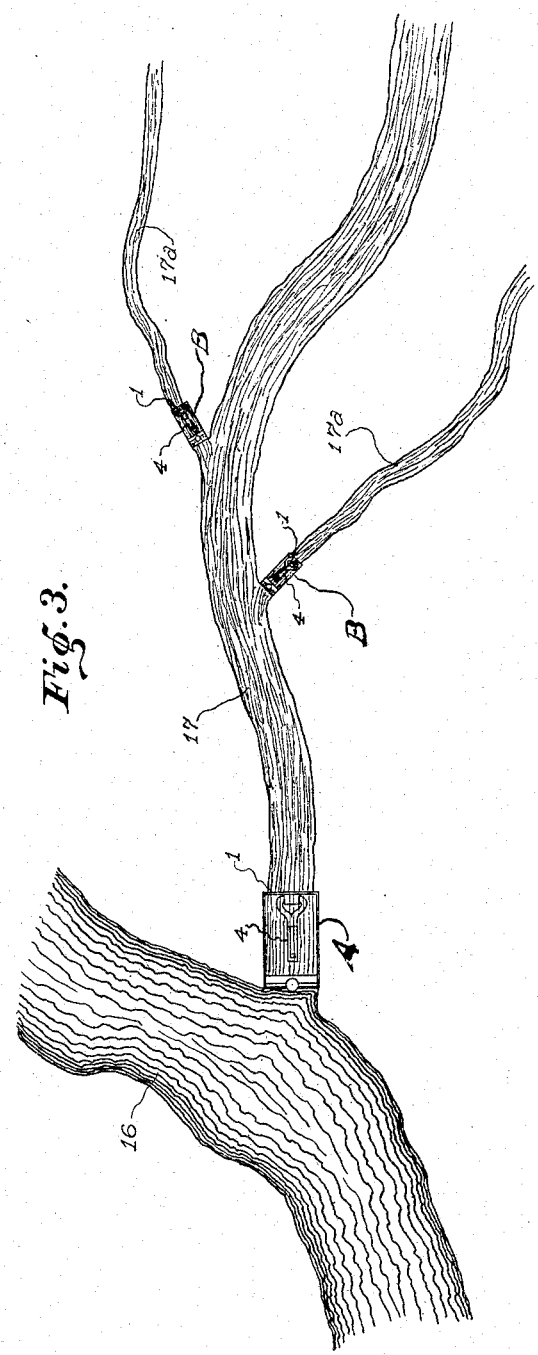
Witnesses.
Inventor.
David Abram Callaway

UNITED STATES PATENT OFFICE.

DAVID ABRAM CALLAWAY, OF PUEBLO, COLORADO, ASSIGNOR OF ONE-THIRD TO H. G. DE TIENNE AND ONE-THIRD TO LYMAN I. HENRY, OF PUEBLO, COLORADO.

HEAD-GATE FOR IRRIGATING-DITCHES.

947,326.  Specification of Letters Patent.  Patented Jan. 25, 1910.

Application filed January 10, 1908. Serial No. 410,193.

*To all whom it may concern:*

Be it known that I, DAVID ABRAM CALLAWAY, a citizen of the United States, residing at Pueblo, in the county of Pueblo and State of Colorado, have invented a new and useful Improvement in Head-Gates for Irrigating-Ditches, of which the following is a specification.

My invention relates to improvements in head-gates for irrigating ditches in which there is a rectangular box, open at the top, having at one end a sliding gate and at the other an opening covered by a casting adaptable to receive the hinge pipes of a floating gate that carries automatically adjustable doors and an air chamber; and the objects of my invention are, first, to provide a head-gate for main and lateral irrigating or other ditches, where a uniform or pro rata flow is desired, that will prevent sand and debris from entering the ditch from the main source of water supply; and, second, to provide a headgate with means that automatically measure and deliver a given quantity or flow of water to the main ditch at varying stages of flood in the main source of water supply; and, third, to provide such head-gate with means that will automatically pro rate the given flow of water in a main ditch or water supply to the several lateral ditches proportionate to the quantity of water carried in the main ditch or water supply, giving the full allotment to each user when water in the main supply is normal or greater than normal, and to pro-rate the quantity or flow of water when the supply is less than normal. I attain these objects by the mechanisms illustrated in the accompanying drawings, in which—

Figure 1 is a perspective view of my invention in partial broken section, removed from the ditch. Fig. 2 is a vertical cross-section of my invention located in position to be operative to receive water from a main source and deliver it to a main ditch; and showing one of my devices in end elevation as it would be used to connect a lateral ditch to the main ditch; Fig. 3 is a conventional plan view showing the arrangement of several of my devices as they may be placed to control the volume of water, as at A, from a main source of supply, and, second, to control the volume or flow from a main ditch to lateral ditches, as at B; Fig. 4 is a detailed view of water doors and connecting arms; and Fig. 5 is a detailed cross sectional view of air valve and portion of air box.

A large head-gate box 1 is situated where the main ditch takes its supply from the main source of water and is properly located so the surface of the water of the main source, 16, will not be higher than the box, 1. The door 13 is raised till opening 14 will admit a greater quantity of water than is to be turned into the main ditch through the floating gate or automatic float hereinafter described. The opening 14 admitting more water than is to be turned into the main ditch will cause box 1 to fill to the level of the main source of water 16 and the water in said box will be practically quiet. The flow of water through openings 7 of the float being less than through 14 there will be less current in box 1 than in the main source, 16, and if opening 14 is much larger than opening 7 the current will be reduced to a minimum, and the current through 14 will be so much less than in the main source 16 that any debris or sand carried in suspension in the water of the main source of supply will wash past the head-gate and not flow into the ditch, thus saving a very great expense for dredging the ditch. The gate 13 may be raised to within a few inches of the top of the water 16 and thereby reduce the current through 14 greatly. By this arrangement practically still water is kept in the box 1, and because of this water being quiet the main water 16 will be quiet for a short distance out in the stream which will cause floating objects and material in suspension to be carried past the head-gate by the current of the stream.

The float in box 1 is composed of a hinge pipe portion 3, 3, that is hinged to the casting 2, and a neck 4 on which air chamber 5 is attached. The neck 4 carries two doors 8, hinged at 21, and on each of these doors, 8, is a sliding cut off, 18, slidable in guides, 20; and the doors 8 are adjustably attached by arms 9 to bars 10 that are pivotally attached to brackets 11, the latter being attached to the delivery end of box 1. Air chamber 5 is provided with an opening at the bottom thereof through and into neck 4, so that upon the neck being submerged air will enter into said chamber 5 and be retained therein; and said chamber 5 is provided with a valve means 6 for releasing any amount of air necessary to secure the desired position of the float below the surface of the water. The openings in doors 8 are similar in size and form to openings 7 of neck 4; the sliding doors 18 being adaptable to diminish or adjust the openings 8 by sliding them along guides 20 that are attached to doors 8 where they are fixed by any suitable set-screw at 19. To adjust the float to deliver a desired amount of water through pipes 3, 3, hinged at 15 that open into the ditch, first the normal depth of water 16 in the stream is ascertained and the float is set with the openings of the doors 8 parallel with openings 7 on the neck, with such a depth of water above the float when the supply is normal as to give the requisite flow through pipes 3, 3, at 15, by the use of regulating cut-offs 18, and when the requisite flow is obtained at normal conditions, the doors 8 are fixed, at the arm 9 with bar 10, and approximately the same quantity of water is thereafter delivered, even if the water in box 1 rises to a greater height, by reason of doors 8 diminishing the openings 7 in proportion to the slope of the float; for example, if doors 8 were left off, the openings 7 would admit more water when the float stands at an angle, as shown in the drawings, and under the water a given depth, than if the float be horizontal and at the same depth from the surface of the water, and in my device owing to the air chamber 5 adjusting the buoyancy, the float stands the same distance from the surface of the water so long as there is a sufficient amount in the headgate box.

The hinge pipes 3, 3, are bolted together by bolts through flanges 12, and are fitted water tight and turnable in holes in casting 2 which is open to the ditch, and bolted to the front end and bottom of box 1, forming a hinge so the float may lie horizontally or stand perpendicularly in the box. The neck 4 is constructed of wood or metal and is bolted to hinge pipes 3, 3, and is made in varying lengths sufficient to cause a similar slope in deep or shallow water and remain a given depth below the surface of the water so the doors 8 will be moved similarly through any rise or fall of the water. The arms 10 are constructed to suit the length of the neck.

From the foregoing it may be seen that the float may be constructed with a long or short neck to be operative in deep or shallow water. The varying slope or height of the neck, by reason of connected arms 9 and bars 10 automatically adjusts doors 8. It may also be noted from the foregoing that if the supply of water is below normal, by my device the main supply of water when desired may be automatically pro-rated. Doors 8 will close off openings 7 proportionately below normal the same as they do above, i. e., if the float is in normal position when standing at a slope of fifteen degrees (a less slope than is shown in the drawings) the openings 7 would be fully open and a downward movement of the float will close the said openings and cut off the flow of water proportionately. Thus in any system of irrigation from a common water supply, if desired, my headgate may be set or regulated upon the main canals, as well as on all laterals in any subdivision, so as to distribute the water automatically pro-rata to the users.

Having thus fully and accurately described my invention so that one versed in the art could make and use the same, what I claim as new and desire to secure by Letters Patent is,—

1. In a head gate device of the character described, comprising a rectangular box having an adjustable inlet door; a casting outlet attached to bottom and outflow end of said box carrying circular openings laterally placed; two pipes hinged in said circular openings in said casting and united back of said casting; a rectangular neck attached to united portion of said pipes having openings in the sides thereof farthest from the junction of said pipes; float means attached to said rectangular neck; all substantially as described.

2. In a head gate device of the character described comprising a rectangular box having an adjustable inlet door; a casting outlet attached to bottom and outflow end of said box carrying circular openings laterally placed; two pipes hinged in said circular openings in said casting and united back of said casting; a rectangular neck attached to united portion of said pipes having openings in the sides thereof farthest from the junction of said pipes; an air chamber attached to top of said neck and at end farthest from said pipes having opening through the bottom thereof; a valve means on top of said air chamber to release air; a hinged door at each of said openings in said neck with openings therein corresponding to the openings in said neck each of said doors carrying slides corresponding to the openings therein; an arm attached to each of said doors; bars pivotally attached at the outlet end of said box and the other end of each of said bars is pivotally attached to one of said arms of said doors; all substantially as described.

In testimony whereof I have signed my name to this specification in the presence of two subscribing witnesses.

DAVID ABRAM CALLAWAY.

Witnesses:
 G. M. DAVIES,
 S. MAUDE ENGLE.